US012718255B2

(12) United States Patent
Mitchiner

(10) Patent No.: US 12,718,255 B2
(45) Date of Patent: Aug. 25, 2026

(54) SYSTEMS AND METHODS FOR AI-DRIVEN CONTINUOUS COMPLIANCE

(71) Applicant: CyKor LLC, Annapolis, MD (US)

(72) Inventor: Mark Mitchiner, San Diego, CA (US)

(73) Assignee: CyKor LLC, Annapolis, MD (US)

( * ) Notice: Subject to any disclaimer, the term of this patent is extended or adjusted under 35 U.S.C. 154(b) by 0 days.

(21) Appl. No.: 19/036,986

(22) Filed: Jan. 24, 2025

(65) Prior Publication Data

US 2026/0220652 A1 Jul. 30, 2026

(51) Int. Cl.
*G06Q 30/018* (2023.01)

(52) U.S. Cl.
CPC .................................. *G06Q 30/018* (2013.01)

(58) Field of Classification Search
CPC ................................................... G06Q 30/018
See application file for complete search history.

(56) References Cited

U.S. PATENT DOCUMENTS 8,997,091 B1 * 3/2015 Watson .................. H04L 43/50
717/170
9,286,275 B2 * 3/2016 Khan .................... G06F 40/143
12,111,754 B1 * 10/2024 Mysore ............... G06F 11/3684
2009/0130641 A1 * 5/2009 Mahesh ................. G16H 40/67
434/262
2025/0005828 A1 * 1/2025 Levins ................. G06Q 30/018

FOREIGN PATENT DOCUMENTS

KR 20240161322 A * 5/2023

* cited by examiner

*Primary Examiner* — Jessica Lemieux
*Assistant Examiner* — Emily M. Kraisinger
(74) *Attorney, Agent, or Firm* — Scale LLP

(57) ABSTRACT

The present disclosure provides a system for model-driven continuous compliance. The system includes a data model engine configured to create a common data model from compliance requirements published by multiple standards bodies using an artificial intelligence (AI) large language model (LLM). A compliance engine comprises a policy datastore and an endpoint datastore, and is configured to apply policy rules from the policy datastore to device configurations in the endpoint datastore. A device abstraction module is configured to translate between the common data model and device-specific configurations. The system enables automatic detection of changes to device configurations and compliance policies, allowing for continuous compliance management across multiple vendor-specific device types and operating systems.

20 Claims, 7 Drawing Sheets

100 FIG. 1

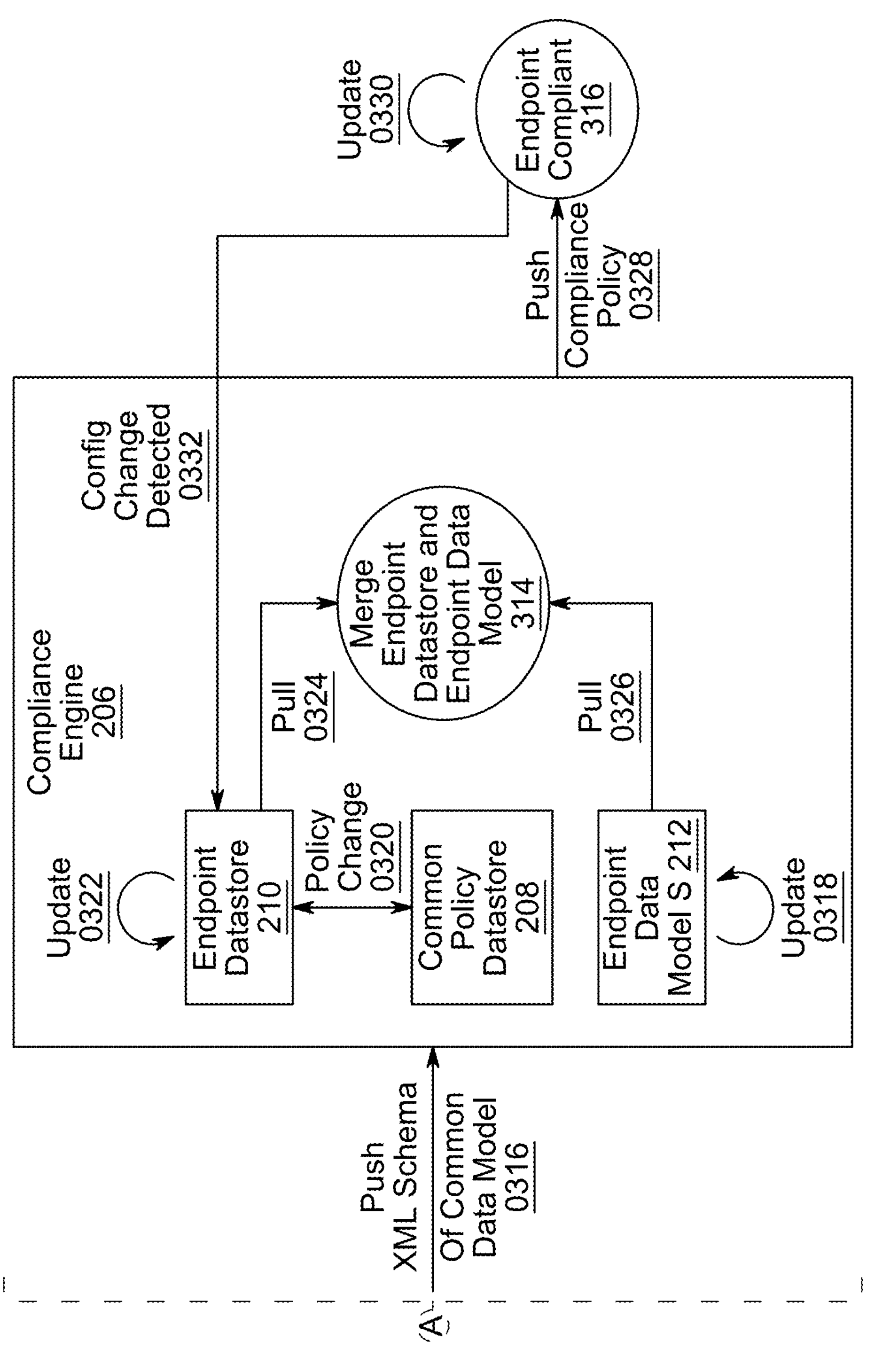
FIG. 3(Conti'd)

SYSTEMS AND METHODS FOR AI-DRIVEN CONTINUOUS COMPLIANCE

TECHNICAL FIELD

The present disclosure relates to compliance management systems, and more particularly to a model-driven continuous compliance system utilizing artificial intelligence to create and enforce a common data model across multiple regulatory standards.

BACKGROUND

Regulatory compliance is crucial for protecting an organization's resources and reputation. It forms the foundation of enterprise security policies and is central to maintaining trust with customers, partners, and vendors. Compliance typically involves adhering to standards, policies, or laws specified as rules or checklists.

In the Information Technology (IT) domain, compliance frameworks provide mechanisms for enforcing configuration standards and facilitating tracking and reporting. Detecting and applying predefined configurations for firewalls, networks, servers, and/or workstations is essential for maintaining an organization's security posture, mitigating threats, and rapidly assessing risks. However, compliance rules specified by regulatory or standards bodies may be vague or open to interpretation.

IT departments face the challenge of translating these rules not only for different device types, such as routers, firewalls, or servers, but also for various vendor operating systems. Conducting precise compliance tests manually across a myriad of devices and vendor operating systems is time-consuming and prone to errors or deviations.

Organizations often need to implement multiple compliance standards simultaneously, such as HIPAA, SOX, PCI, NIST, and DISA, among others. Each of these standards bodies may use different terminology or language in their published compliance rules, even if the end goals are identical. Furthermore, published compliance rules or standards may change over time, adding to the complexity of maintaining compliance.

While organizations have developed various means of attempting to automate the compliance process, the policies themselves may not be precisely defined. Current applications and tools have struggled to achieve meaningful results in significantly reducing effort or improving precision, both in terms of validating compliance rules and remediating compliance policies.

Additionally, compliance is often assessed as a snapshot in time. Any change to the underlying infrastructure, whether it involves firewalls, network devices, or servers, may result in the organization falling out of compliance. This creates a need for continuous monitoring and adjustment to maintain a compliant state.

The challenges in achieving and maintaining compliance across complex IT environments highlight the need for more sophisticated, automated, and adaptive approaches to compliance management. Improved methods for interpreting, implementing, and continuously validating compliance across diverse systems and standards are desirable to enhance organizational security and operational efficiency.

The present disclosure is directed to overcoming one or more of these above-referenced challenges.

SUMMARY OF THE DISCLOSURE

According to certain aspects of the disclosure, systems, methods, and computer readable memory are disclosed for AI-driven compliance.

In some cases, a system for AI-driven continuous compliance includes: a data model engine configured to create a common data model from compliance requirements published by multiple standards bodies using an artificial intelligence (AI); a compliance engine comprising a policy datastore and an endpoint datastore, the compliance engine configured to apply policy rules from the policy datastore to device configurations in the endpoint datastore; and a device abstraction module configured to translate between the common data model and device-specific configurations.

In some cases, a method for AI-driven continuous compliance includes: creating, by a data model engine, a common data model from compliance requirements published by multiple standards bodies using an artificial intelligence (AI); storing policy rules derived from the common data model in a policy datastore of a compliance engine; storing device configurations in an endpoint datastore of the compliance engine; applying, by the compliance engine, the policy rules from the policy datastore to the device configurations in the endpoint datastore; and translating, by a device abstraction module, between the common data model and device-specific configurations.

In some cases, a non-transitory computer-readable medium storing instructions that, when executed by one or more processors, cause the one or more processors to perform operations. The operations may include: creating a common data model from compliance requirements published by multiple standards bodies using an artificial intelligence (AI); storing policy rules derived from the common data model in a policy datastore; storing device configurations in an endpoint datastore; applying the policy rules from the policy datastore to the device configurations in the endpoint datastore; and translating between the common data model and device-specific configurations using a device abstraction module.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

DETAILED DESCRIPTION

Figure 1:
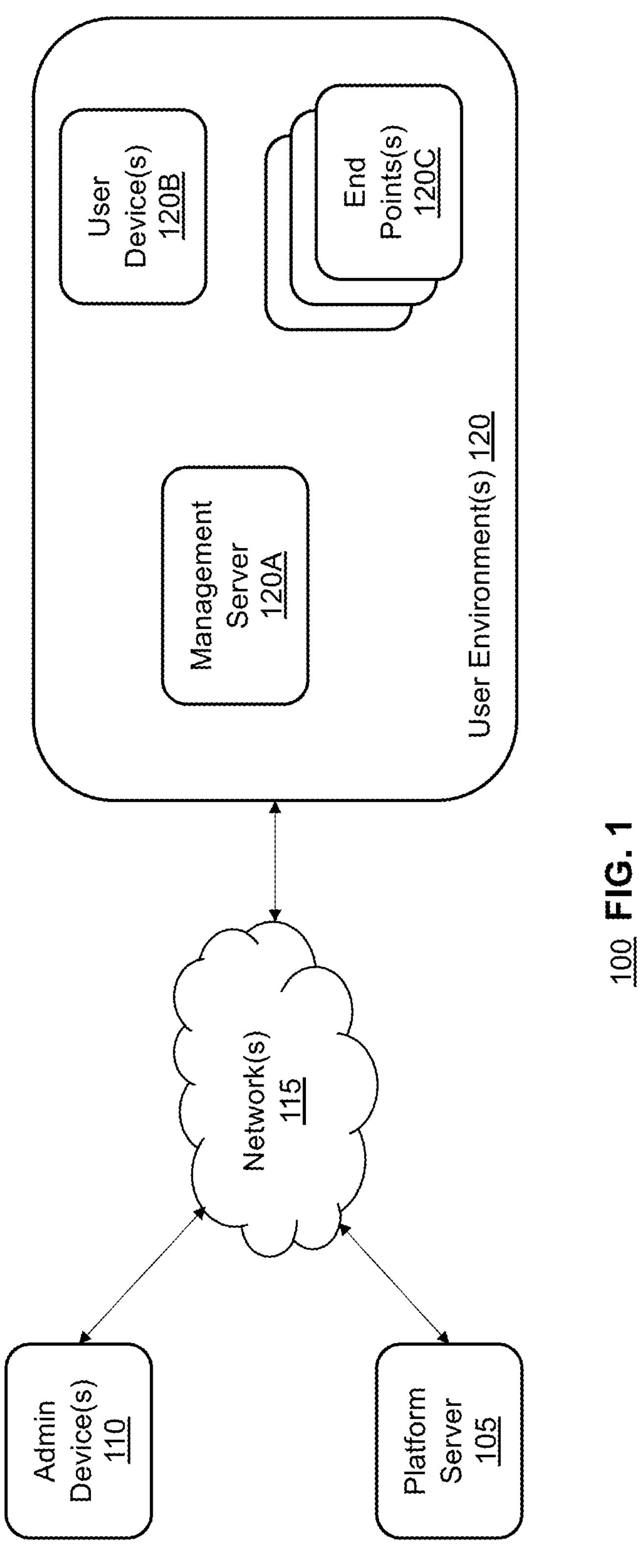
FIG. 1 illustrates a system for implementing compliance management across a network environment, according to aspects of the present disclosure.

The present disclosure relates to a system and method for implementing continuous compliance management across diverse regulatory frameworks. This innovative approach leverages artificial intelligence (AI) and large language models (LLMs) to create a common data model that normalizes compliance requirements from multiple standards bodies.

The system may support a wide range of compliance standards, including but not limited to Health Insurance Portability and Accountability Act (HIPAA), Sarbanes-Oxley Act (SOX), Payment Card Industry Data Security Standard (PCI DSS), Defense Information Systems Agency (DISA) Security Technical Implementation Guides (STIGs), National Institute of Standards and Technology (NIST) guidelines, and General Data Protection Regulation (GDPR).

By utilizing AI-driven techniques, the system may translate diverse compliance requirements into a unified data structure. This common data model may enable more precise and efficient application of compliance rules across various standards and regulatory bodies. The system may also incorporate a stateful compliance engine that continuously monitors and adapts to changes in both compliance requirements and device configurations.

The disclosed approach may offer several key benefits, including improved accuracy in compliance validation, reduced manual effort in interpreting and applying compliance rules, and the ability to maintain continuous compliance in dynamic IT environments. By automating the process of translating, applying, and monitoring compliance policies, organizations may more effectively manage their regulatory obligations across multiple standards and device types.

Thus, methods and systems of the present disclosure may be improvements to computer technology and/or IT compliance/security.

1. Introduction

Regulatory compliance is crucial to protecting both a business's resources, as well as its reputation. It is foundational to an enterprise's security policies, and central to a company's trust with its customer, partners, and vendors. Regulatory compliance consists of standards, policies or laws that must be adhered to and are typically specified as rules or checklists.

In the Information Technology (IT) division within an organization, compliance is a common framework that provides the enforcement of configuration standards, along with tracking and reporting. The detection and application of pre-defined firewall, network, server, and/or workstation configurations are crucial for maintaining compliance for an organization's security posture, threat mitigation, and for rapidly assessing risk. However, the specification of compliance rules by regulatory or standards bodies may be vague or open to interpretation. Moreover, these rules must be translated by IT departments, not only for different device types (such as routers, firewall or servers), but also to the various vendor operating systems.

Conducting precise compliance tests by manual means across a myriad of devices and vendor operating systems is time consuming and prone to error and/or deviation. There are also several different compliance standards that a business may be required to implement, such as HIPAA, SOX, PCI, NIST, DISA and so on. Each of these standards bodies may use different terminology or language in the published compliance rules, even if the end goal of those rules is identical. Furthermore, the published compliance rules or standards may change over time, further adding to delays and errors. In totality, these factors contribute to the enormous challenges faced by enterprise IT departments each day.

While organizations have developed various means of attempting to add "automation" to the compliance process, the policies themselves may not be precisely defined. Currently no application or tool seems to have succeeded in achieving meaningful results towards a significant reduction in effort or improvement in precision—both in terms of validation of compliance rules as well as the remediation of compliance policies. Finally, compliance is most often a snapshot in time. Any change to the underlying infrastructure, be it firewalls, network devices or servers, may result in the organization being out of compliance.

Achieving meaningful success to this problem space requires a modern, innovative approach. First, while the intent of the compliance standards may be simple and definitive, the publications of compliance rules as prose may be ambiguous and open to interpretation by the individuals required to apply and administer them. This lack of precision and clarity of the compliance rules may lead to both false positive and false negative findings of the stated goals. Second, compliance inspections and audits are points in time. Any future configuration changes within the infrastructure may invalidate the compliance status of the devices or endpoints. Similarly, publication of new or updated compliance rules will require a new compliance audit, further adding to the enormous effort required to stay in compliance, as well as delays in compliance validation.

The target for this invention is to create a method and system for a structured data model of compliance policy rules to be applied in a continuous fashion by leveraging a stateful compliance engine in a multivendor environment. This method will allow precision of policy rulesets across a wide variety of standards and compliance bodies in a vendor-neutral fashion. Utilization of Artificial Intelligence (AI) Large Language Models (LLM) for creating a common data model across disparate requirements published by multiple standards bodies. A stateful compliance engine will automatically detect changes to device or endpoint configurations, allowing automated remediation for continuous compliance. This closed-loop feedback system will significantly enhance the time to validate compliant infrastructure as well as remediate devices and endpoints that are out of compliance.

The present disclosure provides a method and system for a structured data model of compliance rules to be applied in a continuous fashion by leveraging a stateful compliance engine in a multivendor environment. The method and system use one or more of the following concepts: (1) use of artificial intelligence (AI) large language models (LLM), (2) use of a data model for policy rules, (3) use of a stateful compliance engine, and (4) use of a device abstraction module.

With respect to LLMs, the LLMs may be used for creating a common data model across disparate requirements published by multiple standards bodies. Translating compliance policy rules to a single common data model allows normalization of policies across disparate standards and compliance bodies.

With respect to data models, the data models may provide a common data structure and language across various standards and compliance bodies. The data model representation of compliance policies may also allow greater precision in the specification of those rules across a wide variety of standards bodies. Finally, the use of the data model facilitates the application and validation of the rules against devices or endpoints.

With respect to the stateful compliance engine, the stateful compliance engine may automatically detect changes to device or endpoint configurations, allowing automated remediation for continuous compliance. A stateful compliance engine utilizing a policy data model will allow the application of rulesets across a wide variety of regulatory and compliance bodies in a vendor-neutral fashion. This closed-loop feedback system will significantly enhance the time to validate compliant infrastructure as well as remediate devices and endpoints that are out of compliance.

With respect to the device abstraction module, the device abstraction module allows a normalized policy ruleset stored in a single, common data model to be applied across a wide variety of vendor device types (such as firewalls, routers, switches or servers) and vendor operating systems (such as Linux and Windows) in a seamless fashion.

There are several different compliance standards that a business may be required to implement, such as HIPAA, SOX, PCI, DISA and so on. Health Insurance Portability and Accountability Act (HIPAA) provides security guidance for health care providers. Payment Card Industry Data Security Standard (PCI DSS) provides security guidance for credit card issuers and operations. Sarbanes-Oxley Act (SOX) compliance is the process of following a US law that requires companies to adhere to certain financial reporting and auditing standards. US Department of Defense (DoD), Defense Information Systems Agency (DISA) Security Technical Implementation Guides (STIGs) provides rules for application towards all DoD IT systems. National Institute for Standards and Technology (NIST) provides security guidance for US Federal Agencies. General Data Protection Regulation (GDPR) of European Union law provides rules that regulate how companies and individuals handle personal data.

Each of these standards bodies may use different terminology or language in the published compliance rules, even if the end goal of the rule is identical. The published compliance rules or standards may change over time. A data model engine may translate the published rules from each of the compliance standards bodies into a single, common data model. In effect, the data model engine normalizes policy rulesets across these disparate standards bodies. Once this occurs, the policy data model will be pushed to a compliance engine (CE).

The compliance engine may be comprised of a policy datastore and an endpoint datastore. The policy datastore may hold the current policy data model, which was received from the data model engine. The policy datastore is updated if a new standards body policy was received, or from a change to an existing compliance policy. The endpoint datastore may hold the current configuration of each of the devices (such as routers, switches, firewalls, servers etc.) that require compliance. This provides a single data structure (represented in a data model) for each of the devices under the CE's management. The policy datastore applies the policy data model to the endpoint datastore model for each device. This brings each device under compliance in the data model. This model is then pushed to the actual device(s) under compliance management via the device abstraction module. This abstraction layer normalizes the endpoint datastore across each of the endpoints, providing vendor-neutral support for the system. At this point, all devices are compliant.

The compliance engine is stateful. Any new policy from a standards body, or any change to an existing policy, is automatically applied to the endpoint datastore model and then pushed to each endpoint. Likewise, any change to device configuration is detected by the CE. If this change results in a compliance policy violation, the policy data model is applied to the endpoint datastore and then pushed to each required endpoint, bringing the device configuration back under compliance.

The method and system provide continuous compliance: a stateful, closed-loop feedback system which automatically detects both changes to the policy rules from standards bodies and changes of the device configuration, automatically remediating devices that are out of compliance.

2. AI-Drive Compliance Management System

FIG. 1 illustrates a system 100 for implementing compliance management across a network environment. The system 100 may include a platform server 105 that connects to a communication network 115. An admin device 110 may also connect to the communication network 115, allowing administrative access to the system 100.

The communication network 115 may connect to a user environment 120, which may contain multiple components. Within the user environment 120, a management server 120A may provide local management capabilities. The user environment 120 may also include a user device 120B for user interactions and an endpoint device 120C for implementing compliance policies.

The network topology of system 100 may show a distributed architecture where the platform server 105 communicates through the communication network 115 to reach components within the user environment 120. The admin device 110 may access and manage the system 100 through the same communication network 115. The management server 120A may serve as a local control point within the user environment 120, coordinating with both the user device 120B and endpoint device 120C.

In some cases, the system 100 may include a device abstraction module. The device abstraction module may allow normalized policy rulesets to be applied across different vendor device types and operating systems. This may enable the system 100 to manage compliance across a diverse range of endpoint devices 120C, regardless of their specific hardware or software configurations.

Figure 2:
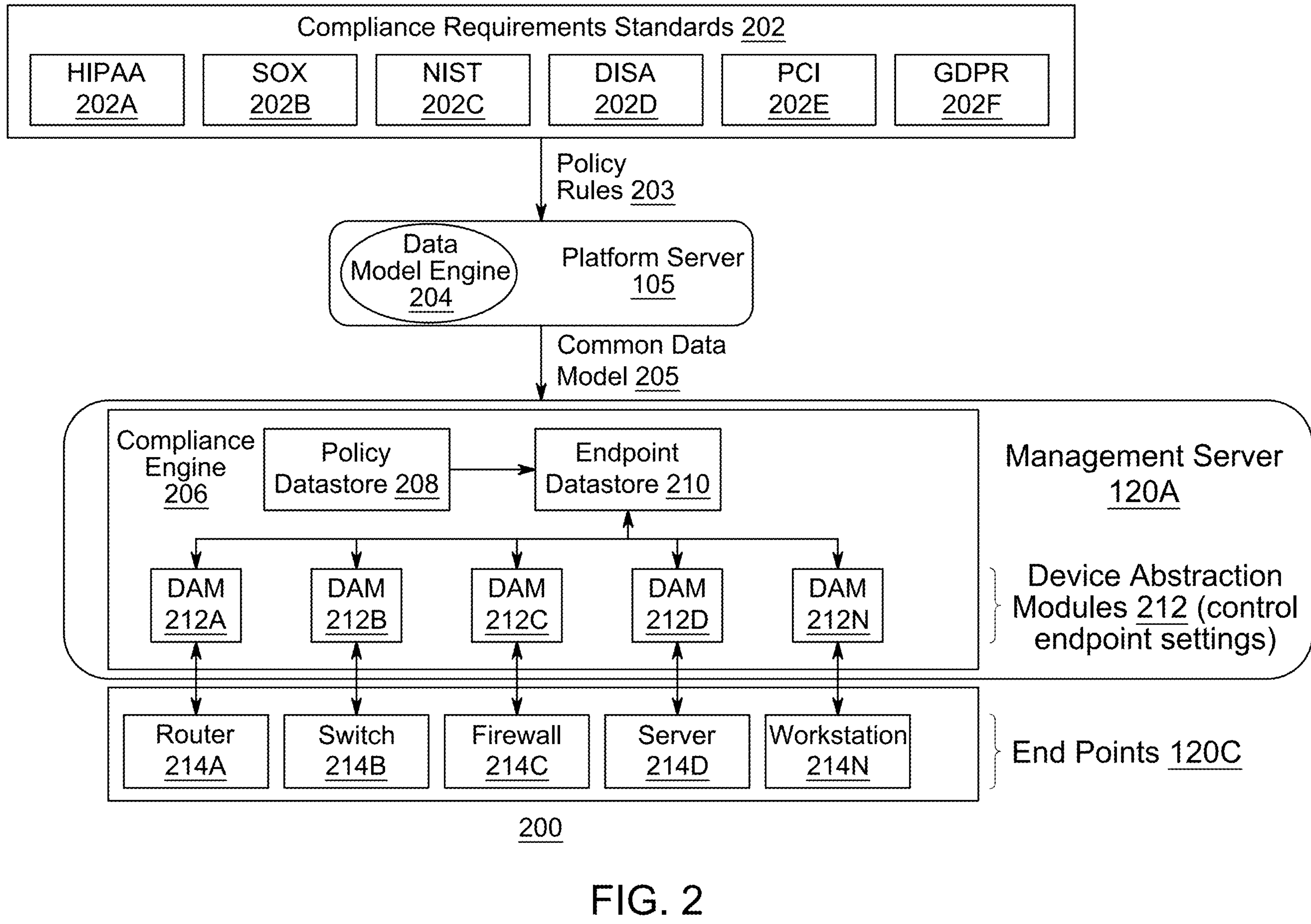
FIG. 2 illustrates a system diagram for model-driven continuous compliance, in accordance with example embodiments.

FIG. 2 illustrates a system diagram 200 for implementing model-driven continuous compliance. The system diagram 200 may include multiple compliance standards 202, such as a HIPAA standard 202A, a SOX standard 202B, a NIST standard 202C, a DISA standard 202D, a PCI standard 202E, and a GDPR standard 202F. These compliance standards 202 may generate policy rules 203 that serve as input to a platform server 105.

The platform server 105 may contain a data model engine 204. The data model engine 204 may process the policy rules 203 to create a common data model 205. In some cases, the data model engine 204 may utilize Artificial Intelligence (AI) Large Language Models (LLM) to create the common data model 205. This approach may allow for more efficient and accurate translation of diverse compliance requirements into a unified data structure.

The common data model 205 may be transmitted to a management server 120A, which may house a compliance engine 206. The compliance engine 206 may be stateful, allowing for continuous monitoring and adaptation to changes in both compliance requirements and device configurations.

Within the management server 120A, the compliance engine 206 may include a policy datastore 208 and an endpoint datastore 210. The policy datastore 208 may interface with device abstraction modules 212, which may include a router module 212A, a switch module 212B, a firewall module 212C, a server module 212D, and/or a workstation module 212N.

The device abstraction modules 212 may connect to corresponding endpoint devices 120C, specifically a router device 214A, a switch device 214B, a firewall device 214C, a server device 214D, and a workstation 214N. The endpoint datastore 210 may maintain configuration information for these devices and communicate with the device abstraction modules 212 to implement compliance policies.

In some cases, the compliance engine 206 may automatically detect changes to device or endpoint configurations. This capability may enable real-time compliance monitoring and rapid response to any deviations from established policies.

The system may enable communication between the policy datastore 208 and endpoint datastore 210, allowing for configuration management and policy enforcement across the various endpoint devices 120C through their respective device abstraction modules 212. This approach may provide a comprehensive and flexible framework for maintaining continuous compliance across diverse regulatory standards and device types.

Figure 3:
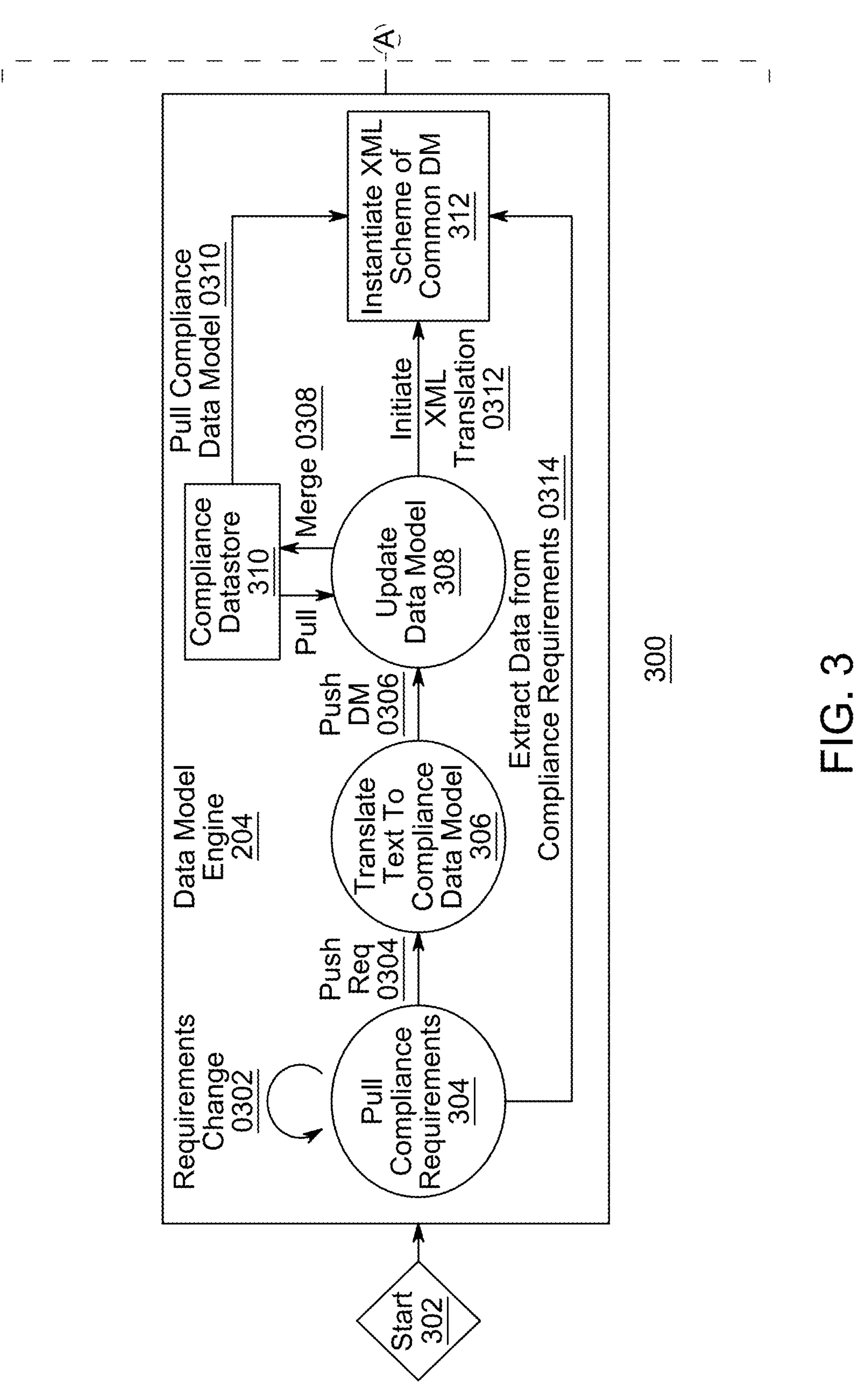
FIG. 3 illustrates a system diagram showing the operation of a compliance management system, according to an embodiment.

FIG. 3 illustrates a system diagram 300 showing the operation of a compliance management system. The system diagram 300 may include a start node 302 that initiates the compliance management process.

In some cases, the system diagram 300 may include a data model engine 204 and a compliance engine 206. The data model engine 204 may process compliance requirements and generate a common data model, while the compliance engine 206 may apply and enforce compliance policies on endpoint devices.

The data model engine 204 may include a compliance requirements module 304 that receives compliance requirements from various standards bodies. A requirements change indicator O302 may signal updates to these requirements. The compliance requirements module 304 may feed into a compliance data model 306 through a compliance push operation O304.

The translation module 306 may perform a translation operation to convert the requirements into a standardized format. The translation module 306 may perform the translation operation to convert compliance requirements into a standardized format using various techniques and processes. This translation operation may involve parsing, analyzing, and transforming the original requirements into a common, standard-agnostic schema.

In some cases, the translation module may utilize natural language processing (NLP) techniques to extract key information from PDF or text documents containing compliance requirements. For example, when processing Security Technical Implementation Guides (STIGs) or other standards documents, the module may identify specific rules, parameters, and controls.

The translation process may involve several steps:

1. Text extraction: For PDF documents, the module may first extract the text content.
2. Requirement identification: The module may use pattern matching or machine learning algorithms to identify individual requirements within the extracted text.
3. Semantic analysis: NLP techniques may be applied to understand the meaning and intent of each requirement.
4. Categorization: Requirements may be categorized into common themes or control areas (e.g., password policies, network configurations, access controls).
5. Mapping to standard schema: The identified requirements may be mapped to a predefined, standard-agnostic schema.

Examples of how different types of requirements may be translated include:

1. Password policies: Original requirement: "Passwords must be at least 12 characters long and contain a mix of uppercase, lowercase, numbers, and special characters." Translated schema: {"category": "password_policy", "min_length": 12, "complexity": ["uppercase", "lowercase", "numbers", "special_characters" ]}
2. Network port configurations: Original requirement: "SSH access must be restricted to port 22." Translated schema: {"category": "network_access", "protocol": "SSH", "port": 22, "action": "restrict" }
3. Access control: Original requirement: "User accounts must be locked after 5 failed login attempts." Translated schema: {"category": "access_control", "action": "lock_account", "trigger": "failed_login_attempts", "threshold": 5}
4. Data encryption: Original requirement: "All data in transit must be encrypted using TLS 1.2 or higher." Translated schema: {"category": "data_protection", "scope": "in_transit", "encryption": {"protocol": "TLS", "min_version": "1.2" }}
5. Audit logging: Original requirement: "System must maintain audit logs for all privileged user actions for at least 90 days." Translated schema: {"category": "audit_logging", "scope": "privileged_user_actions", "retention_period": {"duration": 90, "unit": "days" }}

By translating diverse requirements into a standardized format, the system may more easily compare and apply compliance rules across different standards and device types. This approach may enable more efficient policy enforcement and reduce the complexity of managing multiple compliance frameworks simultaneously.

The translation operation may leverage Large Language Models (LLMs) to handle different phrases and terms in the compliance requirements and map them to a common schema. This approach may enhance the system's ability to interpret and standardize diverse regulatory language.

In some cases, the LLM may be trained (or fine-tuned) on a corpus of compliance documents, regulatory texts, and industry-specific terminology. This training may enable the model to recognize and understand various phrasings and terms used across different compliance standards.

The LLM may perform semantic analysis on the input text, allowing it to understand the context and intent of each requirement beyond just keyword matching. This capability may be particularly useful when dealing with requirements that express similar concepts using different terminology.

For example, when processing password policies, the LLM may recognize that phrases such as "password complexity," "strong password requirements," and "robust authentication criteria" all relate to the same general concept. The model may then map these varied expressions to the appropriate fields in the common schema, such as "min_length" and "complexity."

In some implementations, the LLM may use techniques like zero-shot or few-shot learning to adapt to new or unfamiliar phrasing without requiring extensive retraining. This flexibility may allow the system to handle evolving regulatory language and emerging compliance standards.

The LLM may also assist in resolving ambiguities in the original text. When faced with unclear or imprecise language, the model may use its understanding of compliance contexts to infer the most likely interpretation and map it to the appropriate schema elements.

Additionally, the LLM may help in categorizing requirements that span multiple areas or have interdependencies. For instance, a requirement that touches on both access control and audit logging may be accurately parsed and mapped to multiple relevant sections of the common schema.

By utilizing an LLM in the translation operation, the system may achieve a more nuanced and accurate mapping of diverse compliance requirements to the common schema, potentially improving the overall effectiveness of the compliance management process.

The LLM may read an updated version of a standard, such as a Security Technical Implementation Guide (STIG), and compare it to the existing common schema to detect differences and provide updates. This process may involve several steps and techniques:

1. Document ingestion: The LLM may ingest the updated standard document, which may be in various formats such as PDF, HTML, or plain text. The system may use optical character recognition (OCR) techniques for scanned documents to extract the text content.
2. Structural analysis: The LLM may analyze the structure of the updated document to identify sections, subsections, and individual requirements. This may involve recognizing headings, numbering systems, and other organizational elements specific to the standard.
3. Semantic parsing: The LLM may process the text of each requirement to understand its meaning and intent. This may involve techniques such as named entity recognition, relationship extraction, and contextual understanding.
4. Comparison with existing schema: The LLM may compare each parsed requirement from the updated standard with the corresponding entries in the existing common schema. This comparison may involve: a. identifying exact matches, b. recognizing similar concepts expressed in different language, c. detecting new requirements not present in the existing schema, and/or d. identifying requirements that have been removed or significantly modified.
5. Change detection: Based on the comparison, the LLM may categorize the differences into types of changes, such as: a. minor text changes that do not affect the meaning, b. clarifications or expansions of existing requirements, c. new requirements, d. removed requirements, and/or e. changes in numerical values (e.g., password length, retention periods).
6. Schema update proposals: For each detected change, the LLM may propose updates to the common schema. These proposals may include: a. adding new fields or subfields to accommodate new requirements, b. modifying existing fields to reflect updated language or values, c. marking fields as deprecated for removed requirements, and/or d. adjusting data types or value ranges for modified numerical requirements
7. Confidence scoring: The LLM may assign confidence scores to its proposed updates, indicating the level of certainty in its interpretation and mapping of the changes.
8. Human-readable summary: The system may generate a human-readable summary of the detected changes and proposed schema updates, highlighting significant modifications and areas that may require human review.
9. Version tracking: The system may maintain a version history of the common schema, associating each update with the corresponding version of the standard that prompted the change.
10. Conflict resolution: In cases where updates from different standards conflict, the LLM may flag these conflicts for human review and provide suggestions for reconciliation based on its understanding of compliance principles.

By employing these techniques, the LLM may efficiently process updates to compliance standards, maintain an up-to-date common schema, and facilitate continuous compliance management across evolving regulatory landscapes.

This translated data may be pushed to a data model update module 308 in a push operation O306.

The data model update module 308 may merge the translated requirements by performing a pull/merge operation O308. The data model update module 308 may interface with a compliance datastore 310, which may maintain the consolidated compliance data as a compliance data model.

An xml schema module 312 may receive the compliance data model from the compliance datastore 310 through a pull operation O310. The data model update module 308 may initiate an xml translation operation O312 to convert the stored data into an XML schema. The data model engine 204 may perform a data extraction operation O314 to extract specific data from the compliance requirements and feed it into the xml schema module 312.

In some cases, Natural Language Processing (NLP) or Large Language Models (LLM) may be utilized to perform the data extraction operation O314. These AI-driven techniques may analyze the textual content of compliance requirements to identify key elements, rules, and parameters. The NLP or LLM algorithms may be trained on a diverse set of compliance documents to recognize patterns, extract relevant information, and categorize data according to the compliance data model.

The xml schema module 312 may incorporate validation mechanisms to check the extracted values against predefined rules or ranges from the compliance data model, or to populate the values in the compliance data model. For instance, it may verify that numeric values fall within acceptable limits, that date formats are correct, or that text entries conform to specified patterns. In cases where fields are placeholders, the xml schema module 312 may populate these fields with appropriate values based on the targeted deployment or specific standard requirements. This dynamic population may allow for flexibility in adapting the schema to different compliance contexts.

The system may add or remove types of requirements based on a targeted deployment by utilizing a modular approach to schema definition. Each type of requirement may be represented as a separate module or component within the overall schema structure. When targeting a specific deployment, the system may selectively include or exclude these modules based on the applicable standards or regulations.

In some aspects, the system may employ a configuration management database (CMDB) to store information about the types of requirements associated with different deployment scenarios. When preparing for a targeted deployment, the system may query this database to determine which requirement modules should be activated or deactivated.

The addition or removal of requirement types may also be facilitated through a rules engine that evaluates deployment parameters against a set of predefined conditions. Based on these evaluations, the system may automatically adjust the schema structure to include only the relevant requirement types for the specific deployment context.

Furthermore, the system may provide an interface for administrators to manually customize the types of requirements included in a targeted deployment. This interface may allow for fine-tuning of the compliance schema to address unique organizational needs or industry-specific regulations that may not be captured by the automated selection process.

The xml schema module 312 may generate a complete XML schema representing the compliance requirements based on the set of data it receives. This schema may be pushed to the compliance engine 206 (i.e., the policy datastore 208) through a schema push operation O316.

Within the compliance engine 206, the policy datastore 208 may receive updates through a policy change operation O320. The endpoint datastore 210 may be updated through an engine update operation O322 and may detect configuration changes via a configuration detection operation O332.

A merge module 314 may combine data from the endpoint datastore 210 and the policy datastore 208 to create a comprehensive compliance policy. The system may perform an endpoint pull operation O326 to retrieve the current endpoint configuration and an endpoint data model pull operation O324 to obtain the endpoint data model.

The compliance engine 206 may push the merged compliance policies to the endpoint devices through a compliance push operation O328. A compliant endpoint 316 may receive these updates through endpoint update operations O328 and O330.

In some cases, the system may automatically remediate devices that are out of compliance. If the configuration detection operation O332 identifies a non-compliant configuration, the compliance engine 206 may initiate the compliance push operation O328 to bring the endpoint device back into compliance.

The system diagram 300 may represent a state machine with specific states and modules for processing compliance requirements and updates. Each operation (e.g., O302, O304, O306) may represent a state transition, while the various modules (e.g., compliance requirements module 304, compliance data model 306) may represent different functions within the system. While the states and functions are depicted as different parts, the states and/or functions may be merged or separated in accordance with deployment and infrastructure parameters.

This continuous flow of operations may enable the compliance management system to maintain up-to-date compliance across all managed endpoint devices, adapting to both changes in compliance requirements and device configurations in real-time.

The system provides continuous compliance through a closed-loop feedback system that integrates artificial intelligence (AI) and large language models (LLMs) to normalize and apply compliance policies across diverse regulatory frameworks and device types. This approach enables real-time monitoring, adaptation, and enforcement of compliance requirements in dynamic IT environments.

In some cases, the data model engine may utilize AI and LLMs to process policy rules from multiple compliance standards. The data model engine may analyze the textual content of various regulatory documents, extracting key requirements and translating them into a structured, machine-readable format. This process may result in the creation of a common data model that represents a unified view of compliance requirements across different standards.

The common data model may be transmitted to the compliance engine, which may reside on the management server. The compliance engine may incorporate both a policy datastore and an endpoint datastore. The policy datastore may store the normalized compliance rules derived from the common data model, while the endpoint datastore may maintain current configuration information for various endpoint devices.

In some cases, the compliance engine may continuously monitor the state of endpoint devices through device abstraction modules. These modules may provide a standardized interface for interacting with diverse device types, such as routers, switches, firewalls, servers, and/or workstations, regardless of their specific vendor or operating system.

The closed-loop feedback system may operate by constantly comparing the current state of endpoint devices, as reflected in the endpoint datastore, against the compliance requirements stored in the policy datastore. When discrepancies are detected, the system may automatically initiate remediation actions to bring the affected devices back into compliance.

In some cases, the system may also monitor for changes in compliance requirements. When new or updated standards are detected, the data model engine may process these changes and update the common data model accordingly. The compliance engine may then propagate these updates through the system, ensuring that all managed devices remain compliant with the latest regulatory requirements.

This continuous, automated approach to compliance management may offer several benefits. It may reduce the risk of human error in interpreting and applying complex regulatory requirements. The system may also enable faster response times to both compliance changes and configuration drift, potentially minimizing the window of non-compliance and associated risks. Additionally, by automating much of the compliance process, the system may free up IT resources to focus on more strategic initiatives.

In some cases, the system may generate comprehensive compliance reports, leveraging the detailed information stored in both the policy and endpoint datastores. These reports may provide organizations with real-time visibility into their compliance posture across multiple regulatory frameworks and diverse IT infrastructure.

The integration of AI and LLMs in the compliance modeling process may allow the system to adapt to new regulatory language and concepts over time. This capability may enable the system to maintain effectiveness even as compliance standards evolve and new technologies emerge in the IT landscape.

3. AI-Drive Compliance Management Flowcharts

Figure 4:
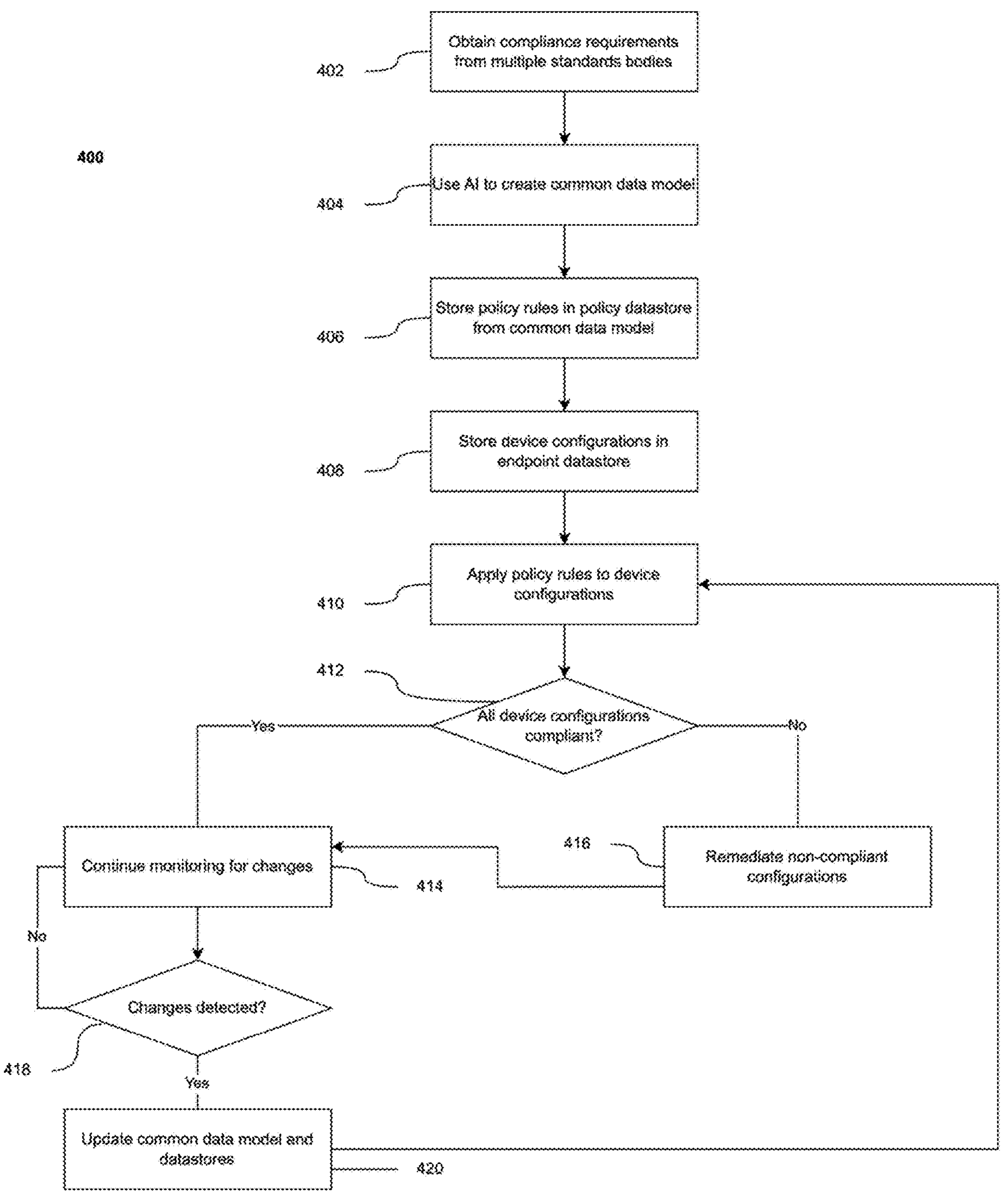
FIG. 4 illustrates a flowchart for a method of managing continuous compliance, according to aspects of the present disclosure.

FIG. 4 illustrates a flowchart for a method 400 of managing continuous compliance. The method 400 may provide a systematic approach to maintaining compliance across diverse regulatory frameworks and device types.

The method 400 may begin with a step 402, where compliance requirements are obtained from multiple standards bodies. These requirements may come from various sources such as HIPAA, SOX, PCI, DISA, NIST, and GDPR. Each of these standards bodies may use different terminology or language in their published compliance rules, even if the end goals are similar.

In a step 404, artificial intelligence (AI) may be used to create a common data model from these requirements. This step may involve utilizing large language models (LLMs) to analyze and interpret the diverse regulatory language, extracting key information and normalizing it into a standardized format. The common data model may serve to normalize policy rulesets across multiple disparate standards bodies, providing a unified representation of compliance requirements.

The method 400 may proceed to a step 406, where policy rules derived from the common data model are stored in a policy datastore. This policy datastore may be part of a compliance engine, which may be configured to manage and enforce compliance policies across the system.

In a step 408, device configurations may be stored in an endpoint datastore. This endpoint datastore may also be part of the compliance engine and may maintain current configuration information for various endpoint devices across the network.

A step 410 may involve applying the policy rules to the device configurations. In this step, the compliance engine may compare the stored policy rules against the current device configurations to identify any discrepancies or non-compliant settings.

The method 400 may then move to a decision block 412, which checks if all device configurations are compliant with the established policy rules. If the configurations are compliant, the method 400 may proceed to a step 414, where monitoring continues for changes. This ongoing monitoring may enable the system to maintain continuous compliance.

If the configurations are not compliant, the method 400 may move to a step 416, where non-compliant configurations are remediated. This remediation process may involve automatically pushing updated configuration settings to affected devices. In some cases, a device abstraction module may be used to translate between the common data model and device-specific configurations, allowing the system to support multiple vendor-specific device types and operating systems.

From step 414, the method 400 may flow to a decision block 418, which determines if any changes are detected. These changes may include updates to compliance policies from standards bodies or modifications to device configurations. If no changes are detected, the method 400 may return to step 414 to continue monitoring.

If changes are detected, the method 400 may proceed to a step 420, where the common data model and datastores are updated accordingly. This step may involve updating the policy datastore with new compliance requirements or adjusting the endpoint datastore to reflect changes in device configurations.

From step 420, the method 400 may return to step 410 to apply the updated policy rules to device configurations, ensuring that the system maintains compliance with the latest requirements.

In some cases, the compliance engine may be configured to generate compliance reports detailing detected configuration changes and remediation actions taken. These reports may provide valuable insights into the organization's compliance posture and the effectiveness of the continuous compliance management process.

The method 400 may represent a stateful, closed-loop feedback system that automatically detects both changes to policy rules from standards bodies and changes in device configuration. By continuously cycling through these steps, the method 400 may provide a robust approach to maintaining compliance across diverse and evolving regulatory landscapes.

Figure 5:
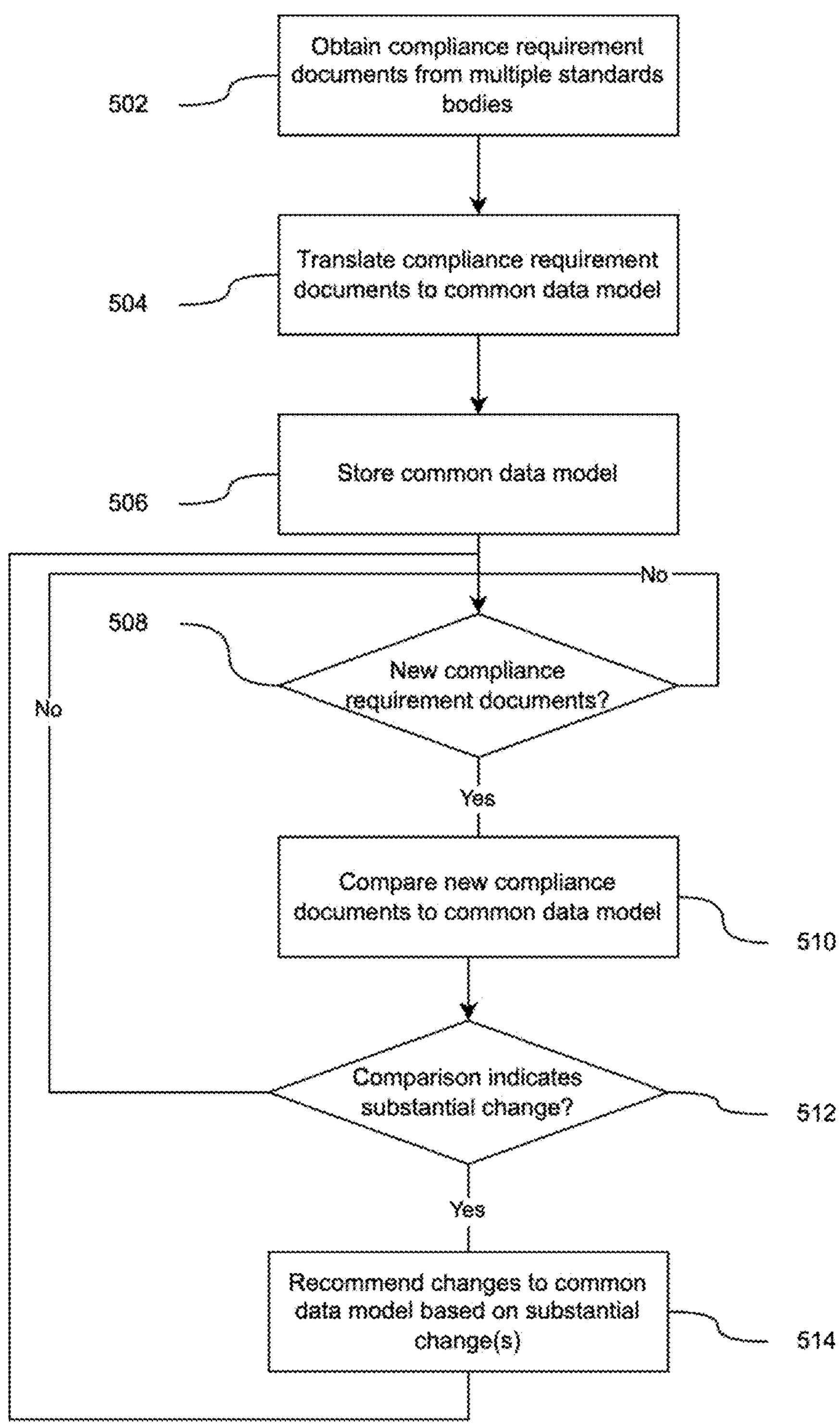
FIG. 5 illustrates a flowchart for a method of managing compliance requirements and data models, in accordance with example embodiments.

FIG. 5 illustrates a flowchart for a method 500 of managing compliance requirements and data models. The method 500 may begin with a step 502, where compliance requirement documents are obtained from multiple standards bodies. In some cases, a data model engine may utilize Artificial Intelligence (AI) Large Language Models (LLM) to process these documents.

In a step 504, the compliance requirement documents may be translated into a common data model. The data model engine may be configured to extract text content from the documents, identify individual requirements using natural language processing (NLP) techniques, and map these requirements to a predefined schema in the common data model. In some cases, the data model engine may categorize the identified requirements into common themes or control areas.

The method 500 may proceed to a step 506, where the common data model may be stored. In some cases, the data model engine may be configured to maintain a version history of the common data model, associating each update with a corresponding version of the compliance standard that prompted the change.

From step 506, the method 500 may move to a decision block 508, which may check if there are new compliance requirement documents. If there are no new documents (No branch), the method 500 may return to decision block 508 to continue monitoring. If there are new documents (Yes branch), the method 500 may proceed to a step 510.

In step 510, the new compliance documents may be compared to the common data model. The data model engine may be configured to analyze updated documents, compare requirements, and propose updates to the common data model. In some cases, the large language model may be configured to compare new documents with existing entries in the common data model.

The method 500 may then flow to a decision block 512, which may determine if the comparison indicates a substantial change. If no substantial change is indicated (No branch), the method 500 may return to decision block 508. If a substantial change is indicated (Yes branch), the method 500 may proceed to a step 514.

In step 514, changes to the common data model may be recommended based on the substantial change(s). The data model engine may be configured to assign confidence scores to the proposed updates, indicating a level of certainty in the interpretation and mapping of the changes.

Throughout this process, the data model engine may be configured to recognize and interpret various phrasings and terms used across different compliance standards. The large language model may be configured to recognize and normalize diverse terminology across different compliance standards. In some cases, the data model engine may resolve ambiguities in compliance requirement text by inferring likely interpretations based on compliance contexts.

The large language model may be configured to identify individual requirements within the analyzed textual content and categorize them into predefined compliance themes or control areas. In some cases, the large language model may perform semantic analysis to determine the meaning and intent of each extracted requirement and map the analyzed requirements to corresponding fields in the common data model schema.

When processing new or updated compliance documents, the large language model may be configured to detect ambiguities in compliance requirement text, infer likely interpretations of the ambiguous text based on contextual analysis, and propose multiple potential mappings to the common data model with associated confidence scores.

In some cases, the data model engine may be configured to generate an XML schema representing the compliance requirements based on the common data model. Generating the XML schema may comprise extracting specific data elements from the compliance requirements, mapping the extracted data elements to corresponding XML tags, and structuring the XML tags in a hierarchical format consistent with the common data model.

The data model engine may be configured to validate the generated XML schema against predefined rules or ranges from the compliance data model and populate placeholder fields in the XML schema with appropriate values based on targeted deployment or specific standard requirements. In some cases, the data model engine may dynamically modify the XML schema structure based on the specific deployment context and selectively include or exclude XML elements corresponding to different types of compliance requirements.

After generating the XML schema, the data model engine may push the generated XML schema to the compliance engine. Pushing the generated XML schema to the compliance engine may comprise transmitting the XML schema to the policy datastore of the compliance engine and updating the policy rules in the policy datastore based on the received XML schema.

By following this method 500, the system may maintain an up-to-date and comprehensive common data model that reflects the latest compliance requirements across multiple standards, enabling efficient and accurate compliance management.

4. Computer System

Figure 6:
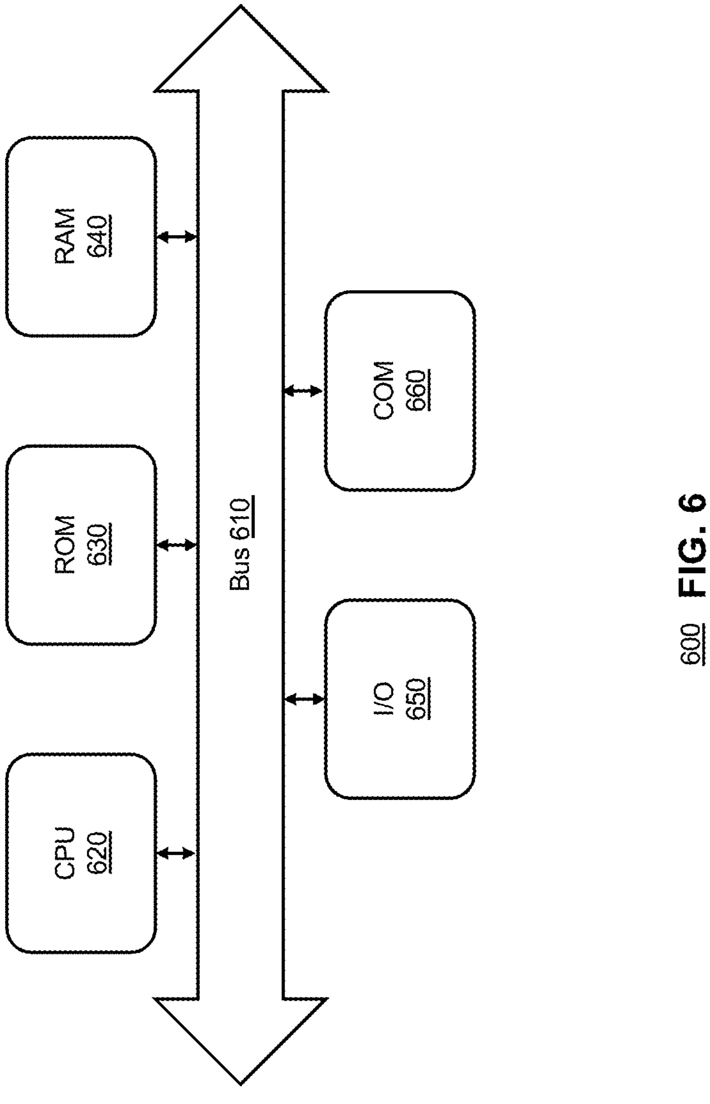
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary cases of the present disclosure. Specifically, the computer (or "platform" as it may not be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

5. Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

As used herein, the terms "transmit," "provide," "receive," and "obtain" may refer to the transfer or communication of data, information, or signals between various components or entities. This may include, but is not limited to, transmission over a network (such as a local area network, wide area network, or the Internet), transfer between devices (such as between computers, smartphones, or other electronic devices), communication between central processing units (CPUs) or graphics processing units (GPUs), exchange of information between microservices, transfer of data between software components within an environment, or any other form of data transfer or communication as indicated by the context in which the terms are used. The specific mode or medium of transmission or provision may vary depending on the particular implementation and system architecture.

As used herein, the term "module" may refer to software code, a software component, a software function, a software application, and firmware. As indicated by context, "module" may be logical, digital, analog, optical, electronic, or quantum implementations of operations or functions. A module may be implemented as a standalone unit or as part of a larger system. In some cases, a module may interact with other modules or components to perform specific tasks or operations within the system. As indicated by context or based on design preference, any two modules may be combined. As indicated by context or based on design preference, any module may be broken into two or more modules that provide some or all of the operations or functions of the single module. The specific implementation of module(s) may vary depending on the requirements of the system and the particular application.

The term "exemplary" is used in the sense of "example" rather than "ideal." As used herein, the singular forms "a," "an," and "the" include plural reference unless the context dictates otherwise.

6. Examples

Exemplary embodiments of the systems and methods disclosed herein are described in the numbered paragraphs below.

A1. A system for AI-driven continuous compliance, the system comprising: a data model engine configured to create a common data model from compliance requirements published by multiple standards bodies using an artificial intelligence (AI); a compliance engine comprising a policy datastore and an endpoint datastore, the compliance engine configured to apply policy rules from the policy datastore to device configurations in the endpoint datastore; and a device abstraction module configured to translate between the common data model and device-specific configurations.

A2. The system of A1, wherein the compliance engine is further configured to automatically detect changes to device configurations and remediate non-compliant configurations.

A3. The system of A2, wherein remediating non-compliant configurations comprises automatically pushing updated configuration settings to affected devices.

A4. The system of A6, wherein the compliance engine is further configured to generate compliance reports detailing detected configuration changes and remediation actions taken.

A5. The system of any of A1-A4, wherein the compliance engine is further configured to automatically detect changes to compliance policies and update device configurations accordingly.

A6. The system of any of A1-A5, wherein the device abstraction module is configured to support multiple vendor-specific device types and operating systems.

A7. The system of any of A1-A6, wherein the common data model normalizes policy rulesets across multiple disparate standards bodies.

A8. The system of any of A1-A7, wherein the data model engine is further configured to: extract text content from compliance requirement documents; identify individual requirements within the extracted text using natural language processing techniques; and map the identified requirements to a predefined schema in the common data model.

A9. The system of A8, wherein the data model engine is further configured to categorize the identified requirements into common themes or control areas.

A10. The system of A8, wherein the data model engine is further configured to: analyze the structure of updated compliance requirement documents; compare each parsed requirement from the updated documents with corresponding entries in the existing common data model; and propose updates to the common data model based on detected changes.

A11. The system of A10, wherein the data model engine is further configured to assign confidence scores to the proposed updates, indicating a level of certainty in the interpretation and mapping of the changes.

A12. The system of any of A1-A11, wherein the data model engine is further configured to: recognize and interpret various phrasings and terms used across different compliance standards; and map diverse expressions of similar concepts to appropriate fields in the common data model.

A13. The system of any of A1-A12, wherein the data model engine is further configured to resolve ambiguities in compliance requirement text by inferring likely interpretations based on compliance contexts.

A14. The system of any of A1-A13, wherein the data model engine is further configured to maintain a version history of the common data model, associating each update with a corresponding version of the compliance standard that prompted the change.

A15. The system of any of A1-A14, wherein the AI includes a large language model, and the large language model is configured to: analyze textual content of compliance requirement documents; extract key information related to specific rules, parameters, and controls; and transform the extracted information into a standardized format compatible with the common data model.

A16. The system of A15, wherein the large language model is further configured to: identify individual requirements within the analyzed textual content; and categorize the identified requirements into predefined compliance themes or control areas.

A17. The system of A15, wherein the large language model is further configured to: perform semantic analysis to determine the meaning and intent of each extracted requirement; and map the analyzed requirements to corresponding fields in the common data model schema.

A18. The system of any of A1-A17, wherein the AI is a large language model, and the large language model is configured to: recognize and interpret diverse terminology and phrasing used across different compliance standards; and normalize the interpreted terminology to a standardized vocabulary within the common data model.

A19. The system of any of A1-A18, wherein the AI is a large language model, and the large language model is configured to: detect ambiguities in compliance requirement text; infer likely interpretations of the ambiguous text based on contextual analysis; and propose multiple potential mappings to the common data model with associated confidence scores.

A20. The system of any of A1-A19, wherein the AI is a large language model, and the large language model is configured to: compare newly ingested compliance documents with existing entries in the common data model; identify additions, modifications, or removals of compliance requirements; and generate proposed updates to the common data model based on the identified changes.

A21. The system of any of A1-A20, wherein the data model engine is further configured to: generate an XML schema representing the compliance requirements based on the common data model; and push the generated XML schema to the compliance engine.

A22. The system of A21, wherein generating the XML schema comprises: extracting specific data elements from the compliance requirements; mapping the extracted data elements to corresponding XML tags; and structuring the XML tags in a hierarchical format consistent with the common data model.

A23. The system of A21, wherein the data model engine is further configured to: validate the generated XML schema against predefined rules or ranges from the compliance data model; and populate placeholder fields in the XML schema with appropriate values based on targeted deployment or specific standard requirements.

A24. The system of A21, wherein pushing the generated XML schema to the compliance engine comprises: transmitting the XML schema to the policy datastore of the compliance engine; and updating the policy rules in the policy datastore based on the received XML schema.

A25. The system of A21, wherein the data model engine is further configured to: dynamically modify the XML schema structure based on the specific deployment context; and selectively include or exclude XML elements corresponding to different types of compliance requirements.

A26. A method for AI-driven continuous compliance, the method comprising: creating, by a data model engine, a common data model from compliance requirements published by multiple standards bodies using an artificial intelligence (AI); storing policy rules derived from the common data model in a policy datastore of a compliance engine; storing device configurations in an endpoint datastore of the compliance engine; applying, by the compliance engine, the policy rules from the policy datastore to the device configurations in the endpoint datastore; and translating, by a device abstraction module, between the common data model and device-specific configurations.

A27. A non-transitory computer-readable medium storing instructions that, when executed by one or more processors, cause the one or more processors to perform operations comprising: creating a common data model from compliance requirements published by multiple standards bodies using an artificial intelligence (AI); storing policy rules derived from the common data model in a policy datastore; storing device configurations in an endpoint datastore; applying the policy rules from the policy datastore to the device configurations in the endpoint datastore; and translating between the common data model and device-specific configurations using a device abstraction module.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for AI-driven continuous compliance, the system comprising: a data model engine configured to:

obtain a plurality of compliance requirements documents published by multiple standards bodies, wherein a first document of the plurality of compliance requirements documents from a first standards body includes different compliance requirements than a second document from a second standards body, wherein a first compliance requirement from the first document includes different terminology than a second compliance requirement from the second document, and wherein the first compliance requirement and the second compliance requirement are associated with a same category; and generate a common data model from the compliance requirements documents using artificial intelligence (AI) comprising a large language model (LLM), wherein the common data model normalizes the compliance requirements of the plurality of compliance requirements documents, wherein policy rules derived from the common data model are stored in a policy datastore of the system, wherein the LLM is trained on a plurality of compliance documents, regulatory texts, and industry-specific terminology, and wherein generating the common data model comprises:

performing, by the LLM, semantic analysis on textual content of the compliance requirements documents to understand context and intent of each requirement;

identifying individual requirements within the textual content:

categorizing the identified requirements into predefined compliance themes or control areas;

mapping the identified requirements to corresponding fields in a predefined schema of the common data model;

generating an Extensible Markup Language (XML) schema representing the compliance requirements based on the common data model, wherein generating the XML schema comprises extracting the identified, categorized, and mapped requirements as data elements, mapping the data elements to corresponding XML tags, and structuring the XML tags in a hierarchical format consistent with the common data model; and transmitting the XML schema to the policy datastore of the compliance engine, wherein the policy rules in the policy datastore are updated based on the received XML schema;

a compliance engine comprising a policy datastore and an endpoint datastore, wherein the compliance engine s configured to apply policy rules from the policy datastore to device configurations for at least some devices of a plurality of endpoint devices that requires compliance, wherein the device configurations are stored as data structures stored in the endpoint datastore;

wherein applying the policy rules from the policy datastore to device configurations includes:

determine whether the device configurations are compliant with the policy rules by comparing a current state of the endpoint devices, as reflected in the endpoint datastore, against the policy rules stored in the policy datastore;

when the device configurations are compliant, continuously monitoring for changes to one or more of the device configurations and the compliance requirements from the multiple standards bodies;

when the changes are detected, performing one or more of updating the common data model, the policy datastore, and the endpoint datastore; and when discrepancies between the device configurations and the policy rules are detected, automatically initiating remediation actions to bring affected devices back into compliance; and a device abstraction module configured to; translate between the common data model and device-specific configurations wherein the device-specific configurations include a device type and a device operating system.

2. The system of claim 1, wherein the compliance engine is further configured to automatically detect changes to device configurations and remediate non-compliant configurations, wherein remediating non-compliant configurations comprises automatically pushing updated configuration settings to affected devices via the device abstraction module.

3. The system of claim 1, wherein the compliance engine is further configured to automatically detect changes to compliance policies and update device configurations accordingly, wherein the compliance engine is stateful, and wherein any new policy from a standards body or any change to an existing policy is automatically applied to the endpoint datastore and pushed to each endpoint device.

4. The system of claim 1, wherein the device abstraction module is configured to support multiple vendor-specific device types and operating systems.

5. The system of claim 1, wherein the common data model provides a unified representation of compliance requirements that serves to normalize policy rulesets across multiple disparate standards bodies including two or more of HIPAA, SOX, PCI, DISA, NIST, and GDPR.

6. The system of claim 1, wherein the data model engine is further configured to: recognize and interpret various phrasings and terms used across different compliance standards; and map diverse expressions of similar concepts to appropriate fields in the common data model.

7. The system of claim 1, wherein the data model engine is further configured to resolve ambiguities in compliance requirement text by inferring likely interpretations based on compliance contexts.

8. The system of claim 1, wherein the large language model is configured to: analyze textual content of compliance requirement documents; extract key information related to specific rules, parameters, and controls; and transform the extracted information into a standardized format compatible with the common data model.

9. The system of claim 8, wherein the predefined compliance themes or control areas comprise one or more of password policies, network configurations, and access controls.

10. The system of claim 8, wherein the semantic analysis comprises recognizing that different phrases relate to a same general concept and mapping varied expressions of the same general concept to fields in the common data model.

11. The system of claim 1, wherein the AI is a large language model, and the large language model is configured to: recognize and interpret diverse terminology and phrasing used across different compliance standards; and normalize the interpreted terminology to a standardized vocabulary within the common data model.

12. The system of claim 1, wherein the AI is a large language model, and the large language model is configured to: detect ambiguities in compliance requirement text; infer likely interpretations of the ambiguous text based on contextual analysis; and propose multiple potential mappings to the common data model with associated confidence scores.

13. The system of claim 1, wherein the AI is a large language model, and the large language model is configured to: compare newly ingested compliance documents with existing entries in the common data model; identify additions, modifications, or removals of compliance requirements; and generate proposed updates to the common data model based on the identified changes.

14. The system of claim 1, wherein the data model engine is further configured to: validate the generated XML schema against predefined rules or ranges from the common data model.

15. The system of claim 14, wherein the data model engine is further configured to populate placeholder fields in the XML schema with appropriate values based on targeted deployment or specific standard requirements.

16. The system of claim 14, wherein the data model engine is further configured to: validate the generated XML schema against predefined rules or ranges from the compliance data model; and populate placeholder fields in the XML schema with appropriate values based on targeted deployment or specific standard requirements.

17. The system of claim 14, wherein the compliance engine is further configured to generate compliance reports detailing detected configuration changes and remediation actions taken.

18. The system of claim 14, wherein the data model engine is further configured to: dynamically modify the XML schema structure based on a specific deployment context; and selectively include or exclude XML elements corresponding to different types of compliance requirements.

19. A method for AI-driven continuous compliance, the method comprising:

obtaining, by a data model engine, a plurality of compliance requirements documents published by multiple standards bodies, wherein a first document of the plurality of compliance requirements documents from a first standards body includes different compliance requirements than a second document from a second standards body, wherein a first compliance requirement from the first document includes different terminology than a second compliance requirement from the second document, and wherein the first compliance requirement and the second compliance requirement are associated with a same category;

generating by the data model engine, a common data model from compliance requirements documents using a-R artificial intelligence (AI) comprising a large language model (LLM);

wherein the common data model normalizes the compliance requirements of the plurality of compliance requirements documents, wherein the LLM is trained on a plurality of compliance documents, regulatory texts, and industry-specific terminology, and wherein generating the common data model comprises:

performing, by the LLM, semantic analysis on textual content of the compliance requirements documents to understand context and intent of each requirement;

identifying individual requirements within the textual content;

categorizing the identified requirements into predefined compliance themes or control areas;

mapping the identified requirements to corresponding fields in a predefined schema of the common data model;

generating an Extensible Markup Language (XML) schema representing the compliance requirements based on the common data model, wherein generating the XML schema comprises extracting the identified, categorized, and mapped requirements as data elements, mapping the data elements to corresponding XML tags, and structuring the XML tags in a hierarchical format consistent with the common data model; and transmitting the XML schema to a policy datastore of a compliance engine, wherein policy rules in the policy datastore are updated based on the received XML schema;

storing device configurations in an endpoint datastore of a compliance engine, wherein the device configurations are stored as data structures for at least some devices of a plurality of endpoint devices that requires compliance;

applying, by the compliance engine, the policy rules from the policy datastore to the device configurations in the endpoint datastore by:

determining whether the device configurations are compliant with the policy rules by comparing a current state of the endpoint devices, as reflected in the endpoint datastore, against the policy rules stored in the policy datastore;

when the device configurations are compliant, continuously monitoring for changes to one or more of the device configurations and the compliance requirements from the multiple standards bodies;

when the changes are detected, performing one or more of updating the common data model, the policy datastore, and the endpoint datastore;

when discrepancies between the device configurations and the policy rules are detected, automatically initiating remediation actions to bring affected devices back into compliance; and translating, by a device abstraction module, between the common data model and device-specific configurations, wherein the device-specific configurations include a device type and a device operating system.

20. A non-transitory computer-readable medium storing instructions that, when executed by one or more processors, cause the one or more processors to perform operations comprising:

obtaining a plurality of compliance requirements documents published by multiple standards bodies, wherein a first document of the plurality of compliance requirements documents from a first standards body includes different compliance requirements than a second document from a second standards body, wherein a first compliance requirement from the first document includes different terminology than a second compliance requirement from the second document, and wherein the first compliance requirement and the second compliance requirement are associated with a same category;

generating a common data model from compliance requirements documents using a-R artificial intelligence (AI) comprising a large language model (LLM);

wherein the common data model normalizes the compliance requirements of the plurality of compliance requirements documents, wherein the LLM is trained on a plurality of compliance documents, regulatory texts, and industry-specific terminology, and wherein generating the common data model comprises:

performing, by the LLM, semantic analysis on textual content of the compliance requirements documents to understand context and intent of each requirement;

identifying individual requirements within the textual content;

categorizing the identified requirements into predefined compliance themes or control areas;

mapping the identified requirements to corresponding fields in a predefined schema of the common data model;

generating an Extensible Markup Language (XML) schema representing the compliance requirements based on the common data model, wherein generating the XML schema comprises extracting the identified, categorized, and mapped requirements as data elements, mapping the data elements to corresponding XML tags, and structuring the XML tags in a hierarchical format consistent with the common data model; and transmitting the XML schema to a policy datastore of a compliance engine, wherein policy rules in the policy datastore are updated based on the received XML schema;

storing device configurations in an endpoint datastore, wherein the device configurations are stored as data structures for at least some devices of a plurality of endpoint devices that requires compliance;

applying the policy rules from the policy datastore to the device configurations in the endpoint datastore by;

determining whether the device configurations are compliant with the policy rules by comparing a current state of the endpoint devices, as reflected in the endpoint datastore, against the policy rules stored in the policy datastore;

when the device configurations are compliant, continuously monitoring for changes to one or more of the device configurations and the compliance requirements from the multiple standards bodies;

when the changes are detected, performing one or more of updating the common data model, the policy datastore, and the endpoint datastore;

when discrepancies between the device configurations and the policy rules are detected, automatically initiating remediation actions to bring affected devices back into compliance; and translating between the common data model and device-specific configurations using a device abstraction module, wherein the device-specific configurations include a device type and a device operating system.

* * * * *